United States Patent
Norman et al.

(10) Patent No.: US 6,934,656 B2
(45) Date of Patent: Aug. 23, 2005

(54) AUTO-LINKING OF FUNCTION LOGIC STATE WITH TESTCASE REGRESSION LIST

(75) Inventors: Jason Michael Norman, South Burlington, VT (US); Nancy H. Pratt, Essex Junction, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 10/605,884

(22) Filed: Nov. 4, 2003

(65) Prior Publication Data

US 2005/0096862 A1 May 5, 2005

(51) Int. Cl.[7] .................................................. G06F 11/26
(52) U.S. Cl. ........................ 702/117; 702/118; 702/119; 716/4
(58) Field of Search ................................. 702/117, 108, 702/118, 119, 120, 123, 124, 126; 324/73.1; 716/3–6, 18; 714/32, 33, 37, 741, 742, 738, 734, 724; 703/13–15, 20

(56) References Cited

U.S. PATENT DOCUMENTS

| | | | | |
|---|---|---|---|---|
| 6,212,667 | B1 | * | 4/2001 | Geer et al. ..................... 716/6 |
| 6,601,229 | B1 | * | 7/2003 | Niederer et al. ............... 716/18 |
| 2004/0216077 | A1 | * | 10/2004 | Roesner et al. ............... 716/18 |

* cited by examiner

*Primary Examiner*—Hal Wachsman
(74) *Attorney, Agent, or Firm*—Richard A. Henkler; Dillon & Yudell LLP

(57) ABSTRACT

A method and system for identifying logic function areas, which make up a virtual machine, that are affected by specific testcases. A Hardware Descriptor Language (HDL) is used to create a software model of the virtual machine. A simulator compiles and analyzes the HDL model, and creates a matrix scoreboard identifying logic function areas in the virtual machine. A complete list of testcases is run on the virtual machine while a monitor correlates each testcase with affected logic function areas to fill in the matrix scoreboard. When a subsequent test failure occurs, either because of a modification to a logic function area, or the execution of a new test, all logic function areas that are affected, either directly or indirectly, are identified.

18 Claims, 9 Drawing Sheets

Figure 3b

| | LOGIC AREA 1 | LOGIC AREA 2 | LOGIC AREA 3 | LOGIC AREA 4 | LOGIC AREA 5 | LOGIC AREA 6 |
|---|---|---|---|---|---|---|
| Testcase A | X | | X | | | |
| Testcase B | | X | X | X | | X |
| Testcase C | X | X | X | X | | |
| Testcase D | | | | | X | |
| Testcase E | | | X | | X | |
| Testcase F | | | | | | |
| ... | | | | | | |
| Testcase X | | | | | | X |

| | LOGIC AREA 1 | LOGIC AREA 2 | LOGIC AREA 3 | LOGIC AREA 4 | LOGIC AREA 5 | LOGIC AREA 6 |
|---|---|---|---|---|---|---|
| PASS Testcase A | X | | | | | |
| PASS Testcase B | | | X | X | X | |
| PASS Testcase C | | | X | X | | X |
| FAIL Testcase D | X | X | | | | |
| FAIL Testcase E | | X | | X | X | |
| PASS Testcase F | | | X | | | |
| ... | | | | | | |
| PASS Testcase X | | | | | | X |
| TOTAL | 1 | 2 | 0 | 0 | 1 | 0 |

Figure 5b

| | LOGIC AREA 1 | LOGIC AREA 2 | LOGIC AREA 3 | LOGIC AREA 4 | LOGIC AREA 5 | LOGIC AREA 6 |
|---|---|---|---|---|---|---|
| FAIL Testcase A | X | | X | | X | |
| PASS Testcase B | | | X | X | | X |
| PASS Testcase C | | | X | X | | |
| FAIL Testcase D | X | X | | | | |
| FAIL Testcase E | | X | X | | X | |
| PASS Testcase F | | | X | | | |
| ... | | | | | | |
| PASS Testcase X | | | | | | X |

AUTO-LINKING OF FUNCTION LOGIC STATE WITH TESTCASE REGRESSION LIST

BACKGROUND OF INVENTION

1. Technical Field

The present invention relates in general to the field of logic design testing, and in particular to the accurately defined logic areas in the logic design. Still more particularly, the present invention relates to a method and system for associating specific logic areas with specific tests, such that a change in the specific logic area or a change in the test will require re-testing only affected logic areas.

2. Description of the Related Art

Building computer logic takes many steps before the computer logic is physically manufactured. The logic designer typically uses synthesis tools, known as Hardware Descriptor Languages (HDLs), to describe, design and document electronic circuits, as well as simulating faults, in software simulations of hardware. Examples of HDLs are VERILOG® and VHDL (Very-high-speed-integrated-circuit Hardware Descriptor Language) for Very Large Scale Integrated Circuits (VLSICs); and Register Transfer Language (RTL) to describe registers in computer logic and the way that data is transferred between such registers. By including a description of interfaces for logic and the logic's behavior, HDLs simulate physical hardware to such an extent that a virtual machine can be constructed in software alone. Such virtual machines are made up of multiple Finite State Machines (FSMs), also referred to as function areas or logic areas. Examples of FSMs are error correction logic, arbitration units, flow-control management units for determining if packets can be sent, etc.

After being constructed in software, the virtual machine is tested using an Architecture Verification Program (AVP), which is a test-case format that specifies an initial input and expected output of the virtual machine. The AVP is made up of multiple testcases, each of which affect one or more FSMs. Although an AVP may be useful in determining if an entire virtual machine is working, erroneous outputs from the virtual machine alone do not identify which FSM or FSMs are responsible for the failure. While documentation comments in the AVP may attempt to identify affected FSMs and thus the source of the failure, such predictions are rarely complete due to unexpected consequences of test software on FSM architecture, as well as unexpected anomalies in the FSM architecture itself. Thus, upon a test failure, the tester of the virtual machine must modify the FSMs predicted by the AVP programmer to be affected by the AVP, and then the entire AVP is re-run. Such a process is very time consuming, as a full AVP may take days to run, making such a process inefficient.

What is needed, therefore, is a method of accurately identifying which FSMs are affected by a testcase. This would allow an engineer to adjust/correct only FSMs affected by a failed testcase. Such a method also would allow the engineer to make changes to the virtual machine, followed by re-testing of only affected FSMs, thus reducing the time to re-test the newly modified virtual machine.

SUMMARY OF INVENTION

The present invention is directed to a method and system for identifying logic function areas, which make up a virtual machine, that are affected by specific testcases. A Hardware Descriptor Language (HDL) is used to create a software model of the virtual machine. A simulator compiles and analyzes the HDL model, and creates a matrix scoreboard identifying logic function areas in the virtual machine. A complete list of testcases is run on the virtual machine while a monitor correlates each testcase with affected logic function areas to fill in the matrix scoreboard. When a subsequent test failure occurs, either because of a modification to a logic function area, or the execution of a new test, all logic function areas that are affected, either directly or indirectly, are identified. This accurate identification allows a tester to correct only such affected logic areas, thus resulting in a savings in test time and resources.

The above, as well as additional objectives, features, and advantages of the present invention will become apparent in the following detailed written description.

BRIEF DESCRIPTION OF DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

FIGS. 3a and 3b illustrate the scoreboard, generated by the monitor, describing which logic areas in the DUT are affected by specific testcases;

FIGS. 5a–b illustrate which test cases fail after altering a logic area;

DETAILED DESCRIPTION

Figure 1:
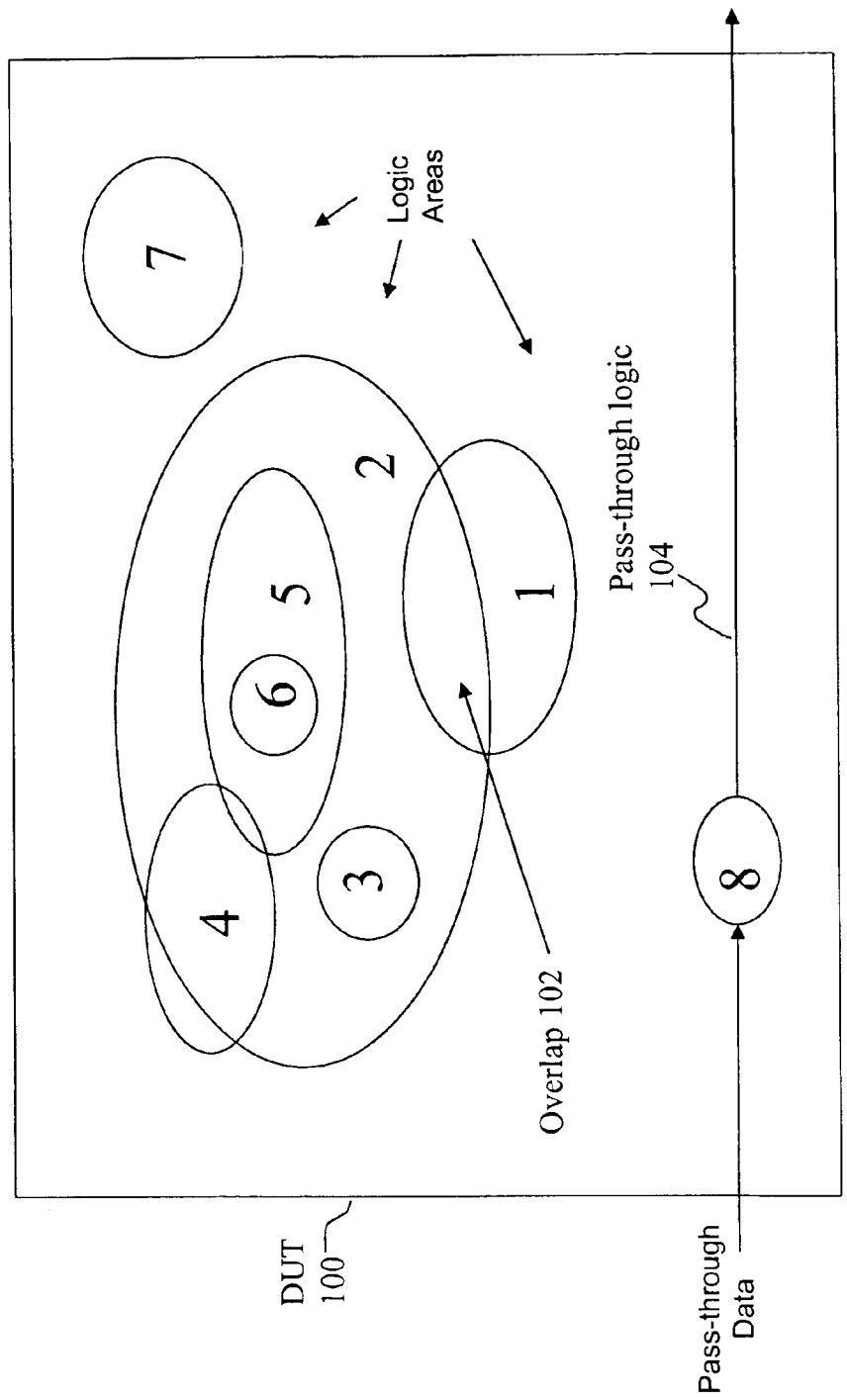
FIG. 1 depicts a logical device under test (DUT), including multiple logic areas.

With reference now to the figures and in particular to FIG. 1, there is depicted a block diagram of a Device Under Test (DUT) 100. DUT 100 is a software model, built with a Hardware Descriptor Language (HDL) synthesis tool, having multiple logic areas 1–8, also known as "logic states." As illustrated, logic areas 1 and 2 have an overlap 102, which is a logical overlap of function or interrelationship, and/or a physical overlap according to the ultimate physical proximity between two logic areas on a physical chip being modeled by a Hardware Descriptor Language (HDL). If overlap 102 is a logical overlap, then a process performed in logic area 1 directly affects logic are 2, such as providing a branch node, calculation result, decision step, etc. While logic areas 3–6 are not directly affected by logic area 1, logic areas 3–6 are indirectly affected by logic area 1 since logic areas 3–6 are directly affected by logic area 2.

Logic area 7 is not affected, either directly or indirectly, by logic area 1, even though logic area 7 does perform some type of logical function that may impact on other logic areas (not shown) in DUT 100. Logic area 8, which is part of a pass-through logic 104, is also not affected by logic area 1, since pass-through logic 104, which may be a scan chain or other type of pass-through logic, does not directly interact with any of the other logic areas in DUT 100.

Figure 2:
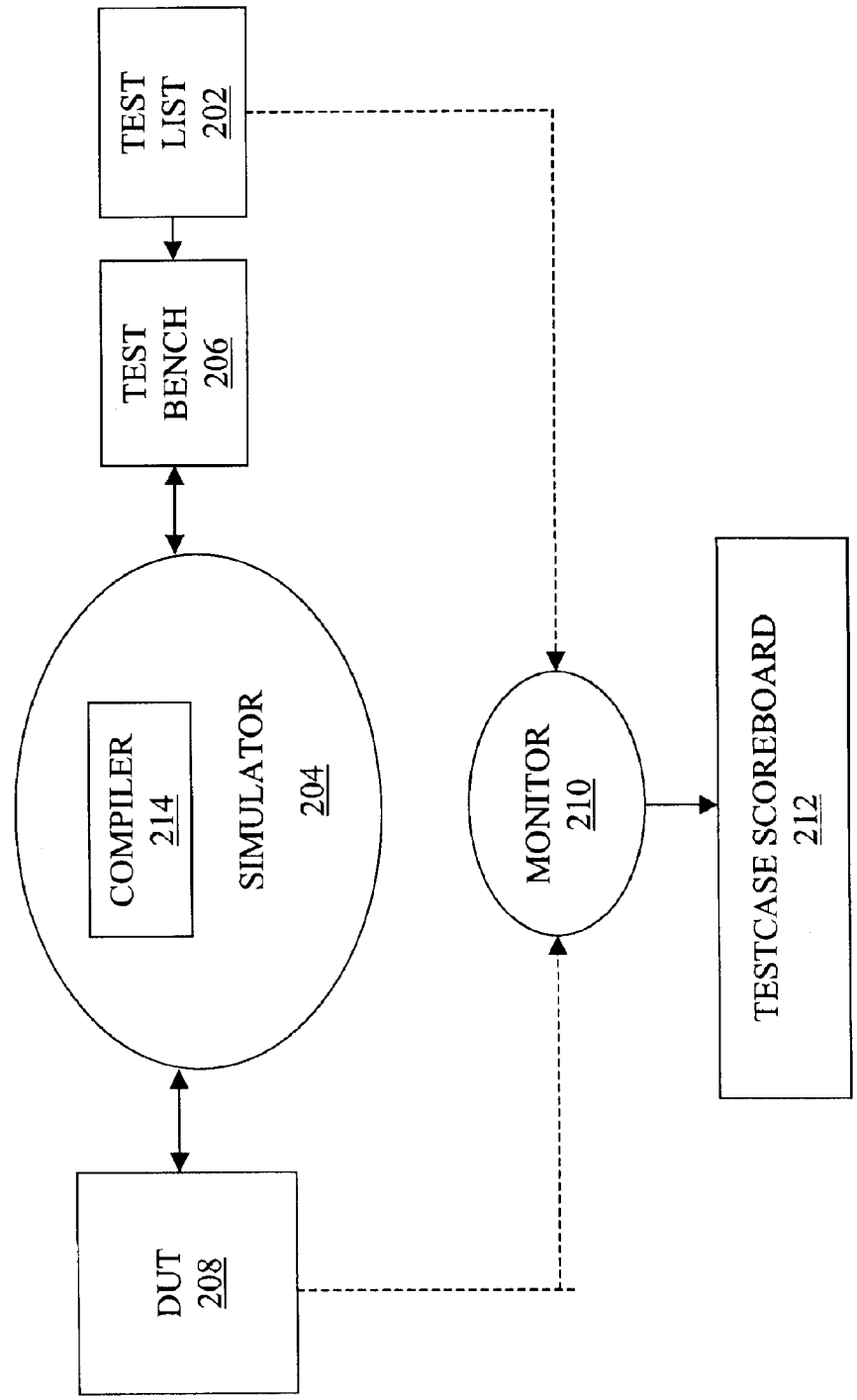
FIG. 2 is a block diagram of software used by the present invention, including a scoreboard generating monitor.

With reference now to FIG. 2, there is depicted a block diagram of software used by the present invention. A test list 202 includes an entire regression list of tests for a device under test (DUT) 208, which comprises multiple logic areas. A simulator 204, interfaces between DUT 208 and a test bench 206, which contains a test, from test list 202, that is currently being executed. Simulator 204 simulates events that incorporate features of the currently executing test. These events are updated during the test execution by simulator 204 with test bench 206. These simulated events are exchanged back and forth with DUT 208 to further update the simulation. Test bench 206 preferably directly monitors logic areas. That is, in a physical logic area, a physical probe would directly monitor whether the physical logic area was being "hit" by a software operation. In a software model such as DUT 100, the virtual logic areas are monitored by test bench 206, which includes software to monitor is a virtual logic area has been "hit." This monitoring is preferably performed by monitoring flags, condition states, or other registers/memory that indicate that a particular logic area is receiving data input and, usually, outputting data processing results.

Simulator 204 also includes a compiler 214, which is used prior to execution of testing to define logic areas in DUT 208. These logic areas are used to construct a testcase scoreboard 212, about which more is described below.

Figure 3A:
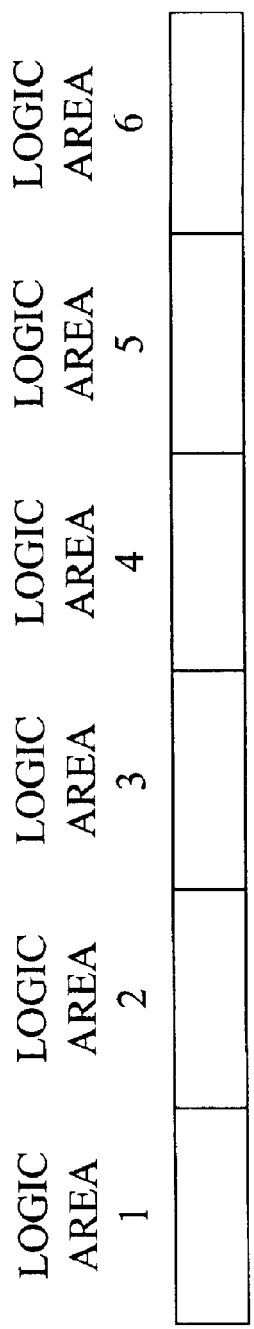

A monitor 210 correlates logic state areas in DUT 208 with specific testcases from test list 202. This correlation is used to both create as well as fill in a testcase scoreboard 212. That is, on a first pass, monitor 210 begins the creation of an empty matrix scoreboard 212 as shown in FIG. 3a, in which logic areas are defined according to an analysis of the compiled HDL defining DUT 208. On a second pass, monitor 210 completes testcase scoreboard 212, as shown in greater detail in FIG. 3b, by checking off each logic area that is affected by each newly added testcase. As shown in exemplary FIG. 3b, Testcase A affects logic areas 1, 3 and 5, while Testcase B affects only logic areas 3 and 4. The "X" notations in FIG. 3b represent a correlation performed by monitor 210, which monitors nodes in DUT 208 for activity caused by a specified testcase.

Figure 4:
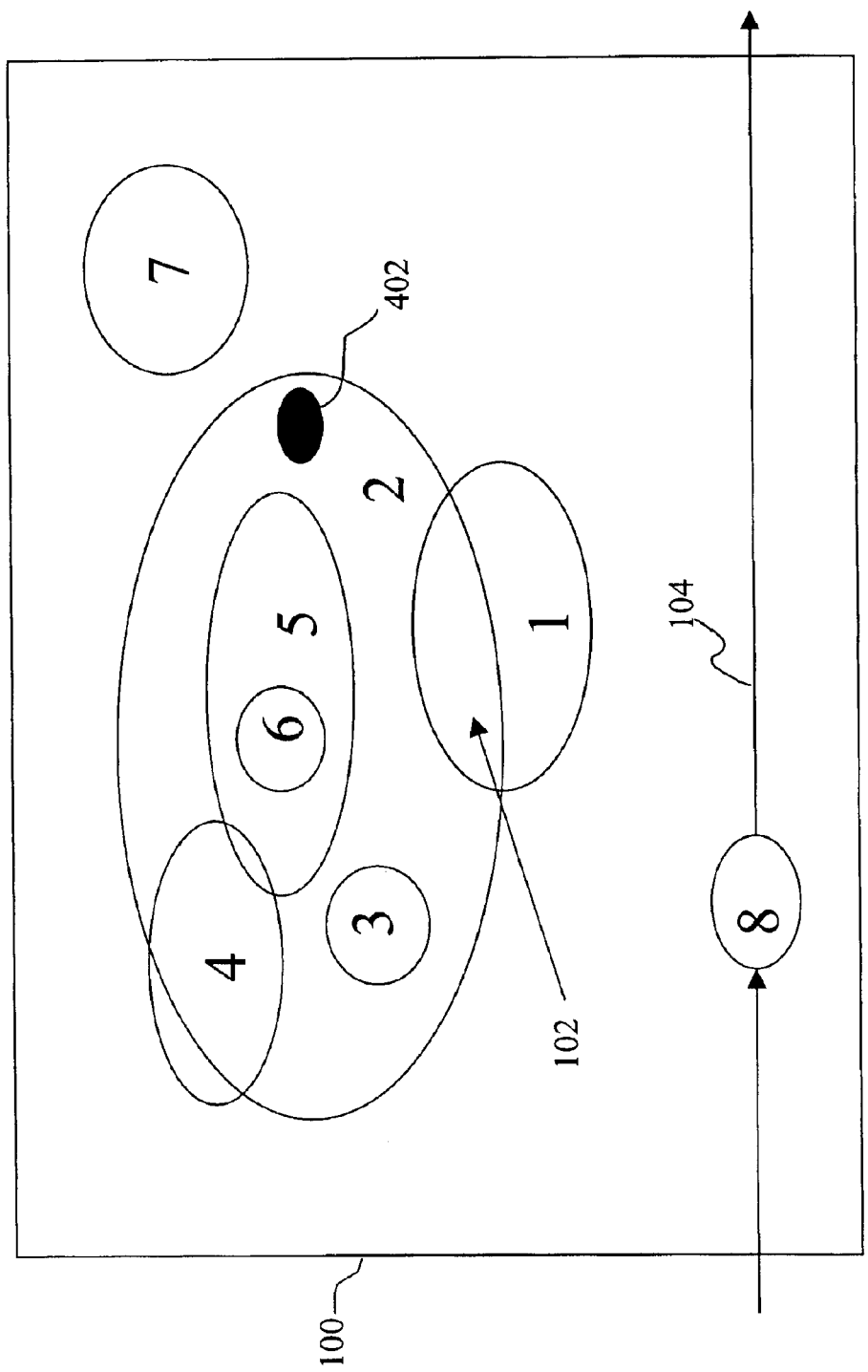
FIG. 4 depicts an addition of a new logic area to the DUT.

After scoreboard 212 has been completed as shown in FIG. 3b, it can be used to locate likely problem logic areas in the future. For example, suppose a new logic area 402 is added, as shown in FIG. 4 within logic area 2. Since the scoreboard shown in FIG. 3b indicates that only Testcases D and E test logic area 2, then only these two testcases are run. If Testcases D and E fail, as shown, then there are two most probable reasons. The first is that new logic area 402 has had a direct adverse effect on logic area 2. The second is that new logic area 402 has had an indirect adverse effect on logic area 1 or logic area 5, since these two logic areas are also affected by Testcases D and E. Through the use of the scoreboard shown in FIG. 5a, a logical decision can be made as to determine how to pinpoint where the logic fault lies.

A first method to pinpoint the location of the fault is to count how many logic areas are involved in the failed testcases. For example, the two failed Testcases D and E shown in FIG. 5a used logic area 2 twice, but logic areas 1 and 5 only once. Thus, it can be predicted that logic areas 1 and 5 are less likely to be the problem area than logic area 2. While such a conclusion is fairly obvious in the example shown, in which logic are 2 is the area that was altered, this "counting" technique becomes much more powerful when there are many more testcases and logic areas. In such cases, the logic area having the highest occurrence in failed testcases is often a logic area that was NOT altered. In the example shown then, even if logic area 2 had not been altered, the appearance of logic area 2 in both failed Testcases D and E indicates that logic area 2 is likely the area posing the problem.

Alternatively, testcase scoreboard 212 can be used to select which testcases are run after Testcases D and E fail, in order to more accurately pinpoint where the problem logic area is located. Using the illustration of FIG. 5a, when Testcases D and E fail, a search is made for other testcases using logic areas that are tested by Testcases D and E. No other testcases test logic area 2, but Testcase A also tests logic areas 1 and 5. Thus, Testcase A is subsequently run, and fails, as shown in FIG. 5b. Since Testcase A does not use logic area 2, then there is a strong presumption that logic area 2 is not the problem after all. However, since Testcase A uses logic areas 1 and 5, Testcase D uses logic area 1, and Testcase E uses logic area 5, then there is a strong likelihood that new logic area 402 has had an adverse indirect impact on logic areas 1 and 5.

Figure 6:
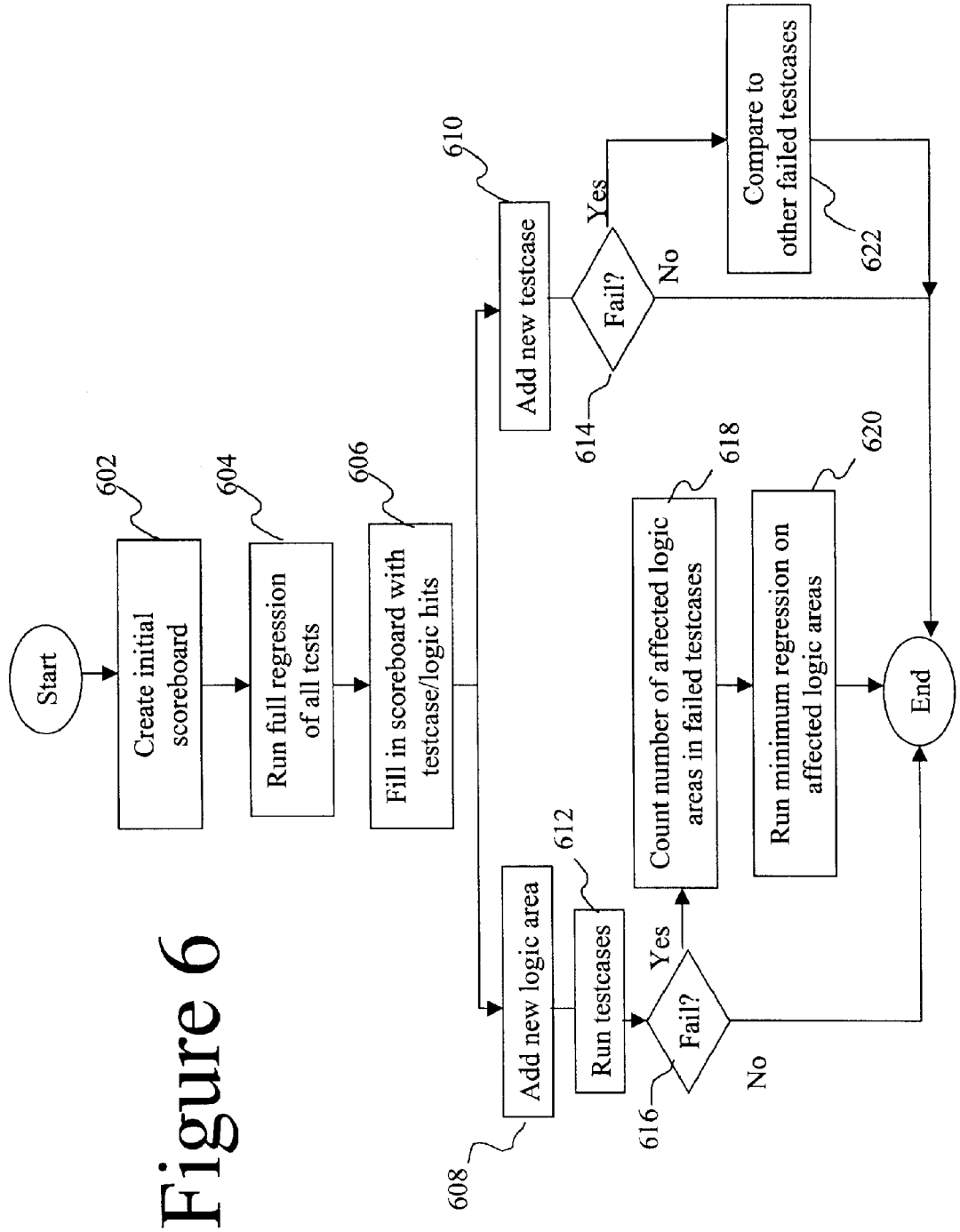
FIG. 6 is a flow-chart of steps taken in practice of a preferred embodiment of the present invention.

With reference now to FIG. 6, a preferred embodiment of the present invention is described in a flow-chart. Starting at block 602, an initial scoreboard is created by identifying logic areas in the DUT. A full regression of all tests is run on the DUT (block 604), which results in the completion of the scoreboard (block 606) identifying each logic block affected by each testcase.

If a new testcase is added (block 610), it is run. If it passes (decision block 614), then no further action is taken. However, if the new testcase fails, then other testcases that failed are examined and compared (block 622), to identify testcases having common logic areas. The presence of such common areas is a good indicator of which logic area(s) have a problem.

If a new logic area is added or an existing logic area is altered (block 608), then the testcases that use that area of logic are run (block 612). If the selected testcases pass (decision block 616), then no further steps are taken. However, if there are one or more failures in the chosen testcases, then the common affected logic areas are counted (block 618), and a minimum regression is run using testcases that test the affected logic areas, either directly or indirectly (block 620), as described above in FIG. 5b.

Figure 7:
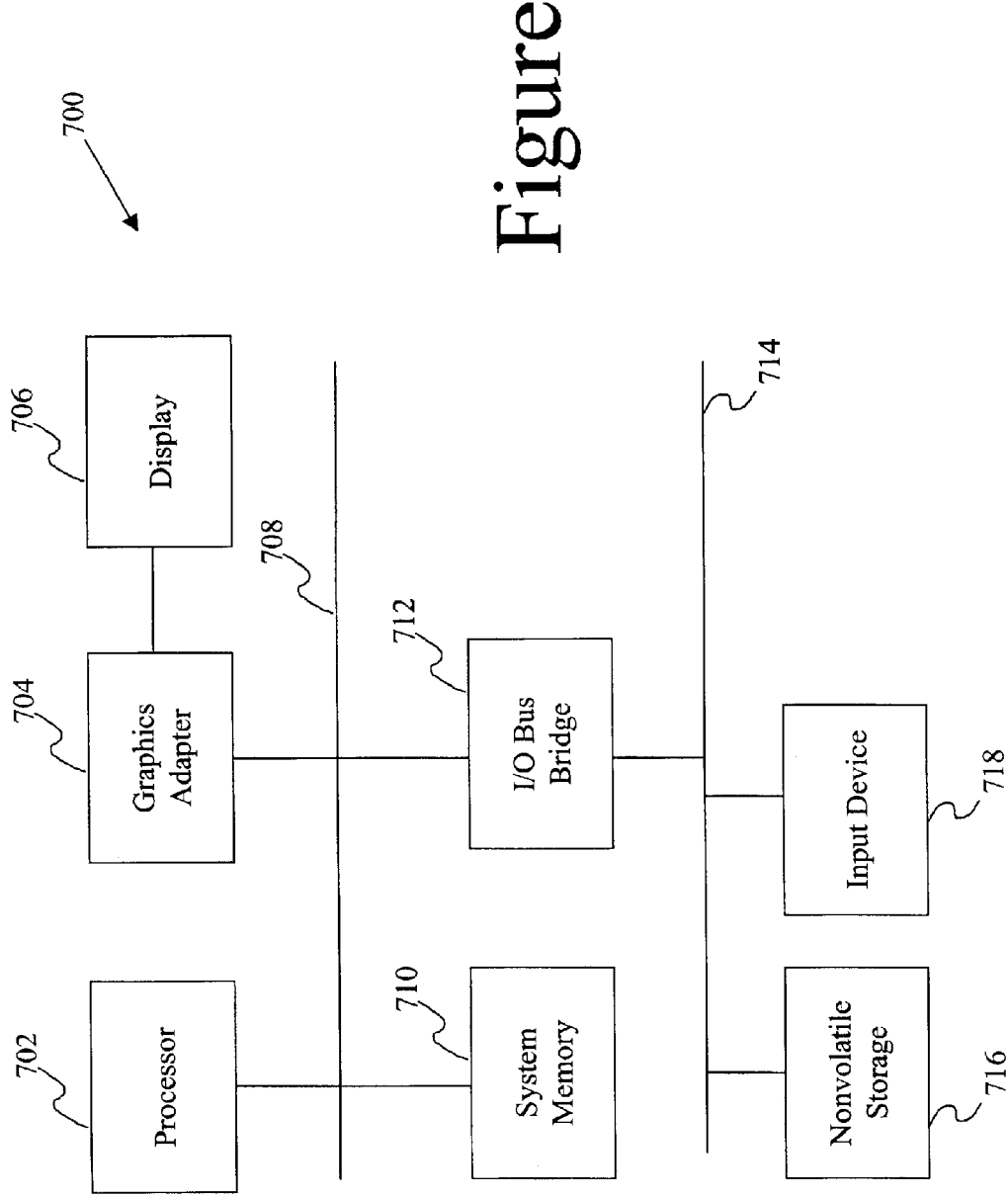
FIG. 7 depicts a preferred data processing system used to control and manage the present invention.

With reference now to FIG. 7, there is depicted a block diagram of a preferred embodiment of a data processing system 700 used to implement the present invention in the creation and logical use of the scoreboard. Data processing system 700 is preferably used to run all software described in FIG. 2.

Data processing system 700 includes a processor 702, which is connected to a system bus 708. In the exemplary embodiment, data processing system 700 includes a graphics adapter 704 also connected to system bus 708, receiving information for display 706.

Also connected to system bus 708 are system memory 710 and input/output (I/O) bus bridge 712. I/O bus bridge 712 couples I/O bus 714 to system bus 708, relaying and/or transforming data transactions from one bus to the other. Peripheral devices such as nonvolatile storage 716, which may be a hard disk drive, floppy drive, a compact disk read-only memory (CD-ROM), a digital video disk (DVD) drive, or the like, and input device 718, which may include a conventional mouse, a trackball, or the like, is connected to I/O bus 714. The software described in FIG. 2 is preferably stored in both system memory 710 and nonvolatile storage 716.

The exemplary embodiment shown in FIG. 7 is provided solely for the purposes of explaining the invention and those skilled in the art will recognize that numerous variations are possible, both in form and function. For instance, data processing system 700 might also include a sound card and audio speakers, and numerous other optional components. All such variations are believed to be within the spirit and scope of the present invention.

It should be understood that at least some aspects of the present invention may alternatively be implemented in a program product, preferably performing the functions of the present invention in an automatic manner based on pre-determined criteria as described, including relative logical relationships between and among logic areas. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for testing an integrated circuit, the method comprising:
    grouping a circuit logic into one or more logic areas;
    associating each one of the logic areas with one or more first testcases;
    altering a circuit in one of the logic areas to create an altered logic area from an unaltered said one or more logic areas;
    testing the altered logic area using only the one or more first testcases associated with the unaltered logic area;
    identifying failed first testcases; and
    counting the number of logic areas in the failed first testcases to predict which logic areas are adversely affected by the altering of the circuit.

2. The method of claim 1, further comprising:
    identifying other logic area utilized by the failed first testcases, the other logic area being different from the altered logic area;
    running at least one second testcase that tests the other logic area;
    identifying the second testcases that fail; and
    identifying common logic areas affected by the failed second testcases and the failed first testcases to predict which logic areas are adversely affected by the altering of the circuit.

3. The method of claim 2, wherein the failed first and second testcases are mapped on a scoreboard that affords a visual view of a relationship among affected logic areas to predict which logic areas are defective.

4. The method of claim 2, wherein the predicting of which logic areas are adversely affected is achieved by identifying a common logic area in both the first and second failed testcases.

5. The method of claim 1, wherein the integrated circuit is a virtual circuit created by a hardware descriptor language.

6. The method of claim 1, further comprising:
    running a new testcase on one of the logic areas in the circuit logic;
    if the new testcase fails, examining other failed first testcases in other logic areas in the circuit logic; and
    identifying a common logic area that failed the new testcase and the first testcases to predict a defect in the common logic area in the circuit logic.

7. A system for testing an integrated circuit, the system comprising:
    means for grouping a circuit logic into one or more logic areas;
    means for associating each one of the logic areas with one or more first testcases;
    means for altering a circuit in one of the logic areas to create an altered logic area from an unaltered said one or more logic areas;
    means for testing the altered logic area using only the one or more first testcases associated with the unaltered logic area;
    means for identifying failed first testcases; and
    means for counting the number of logic areas in the failed first testcases to predict which logic areas are adversely affected by the altering of the circuit.

8. The system of claim 7, further comprising:
    means for identifying other logic area utilized by the failed first testcases, the other logic area being different from the altered logic area;
    means for running at least one second testcase that tests the other logic area;
    means for identifying the second testcases that fail; and
    means for identifying common logic areas affected by the failed second testcases and the failed first testcases to predict which logic areas are adversely affected by the altering of the circuit.

9. The system of claim 8, wherein the failed first and second testcases are mapped on a scoreboard that affords a visual view of a relationship among affected logic areas to predict which logic areas are defective.

10. The system of claim 8, wherein the predicting of which logic areas are adversely affected is achieved by identifying a common logic area in both the first and second failed testcases.

11. The system of claim 7, wherein the integrated circuit is a virtual circuit created by a hardware descriptor language.

12. The system of claim 7, further comprising:
    means for running a new testcase on one of the logic areas in the circuit logic;
    means for, if the new testcase fails, examining other failed first testcases in other logic areas in the circuit logic; and
    means for identifying a common logic area that failed the new testcase and the first testcases to predict a defect in the common logic area in the circuit logic.

13. A computer program product, residing on a computer usable medium and executable on a computer, for testing an integrated circuit, the computer program product comprising:
    program code for grouping a circuit logic into one or more logic areas;
    program code for associating each one of the logic areas with one or more first testcases;

program code for altering a circuit in one of the logic areas to create an altered logic area from an unaltered said one or more logic areas;

program code for testing the altered logic area using only the one or more first testcases associated with the unaltered logic area;

program code for identifying failed first testcases; and program code for counting the number of logic areas in the failed first testcases to predict which logic areas are adversely affected by the altering of the circuit.

14. The computer program product of claim 13, further comprising:

program code for identifying other logic area utilized by the failed first testcases, the other logic area being different from the altered logic area;

program code for running at least one second testcase that tests the other logic area;

program code for identifying the second testcases that fail; and program code for identifying common logic areas affected by the failed second testcases and the failed first testcases to predict which logic areas are adversely affected by the altering of the circuit.

15. The computer program product of claim 14, wherein the failed first and second testcases are mapped on a scoreboard that affords a visual view of a relationship among affected logic areas to predict which logic areas are defective.

16. The computer program product of claim 14, wherein the predicting of which logic areas are adversely affected is achieved by identifying a common logic area in both the first and second failed testcases.

17. The computer program product of claim 13, wherein the integrated circuit is a virtual circuit created by a hardware descriptor language.

18. The computer program product of claim 13, further comprising:

program code for running a new testcase on one of the logic areas in the circuit logic;

program code for, if the new testcase fails, examining other failed first testcases in other logic areas in the circuit logic; and program code for identifying a common logic area that failed the new testcase and the first testcases to predict a defect in the common logic area in the circuit logic.

* * * * *